April 25, 1933.  L. C. CARTON  1,905,619
CEMENT BLOCK MOLDING MACHINE
Filed Dec. 21, 1929   5 Sheets-Sheet 1

Inventor
Lee C. Carton.

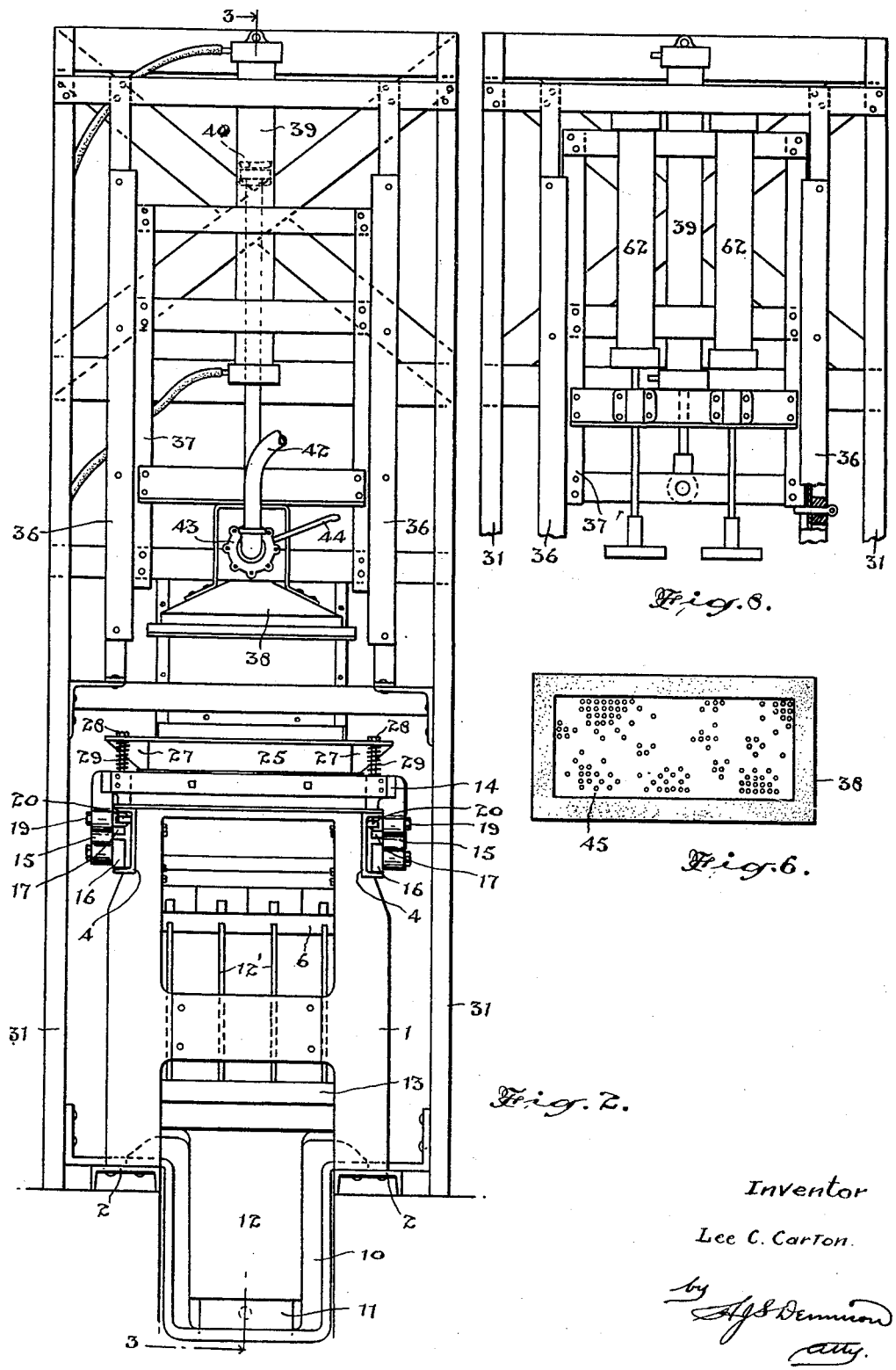

April 25, 1933.  L. C. CARTON  1,905,619
CEMENT BLOCK MOLDING MACHINE
Filed Dec. 21, 1929   5 Sheets-Sheet 3
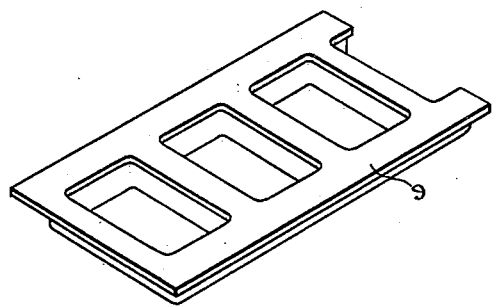
Fig. 9.
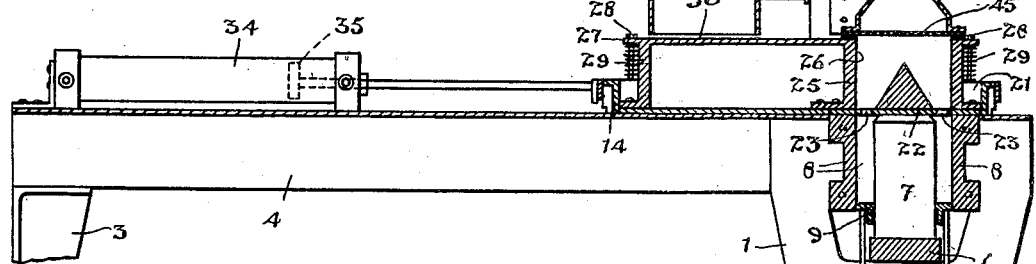
Fig. 3.
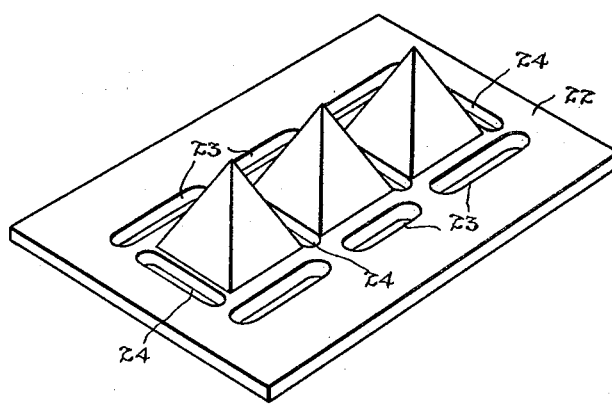
Fig. 7.
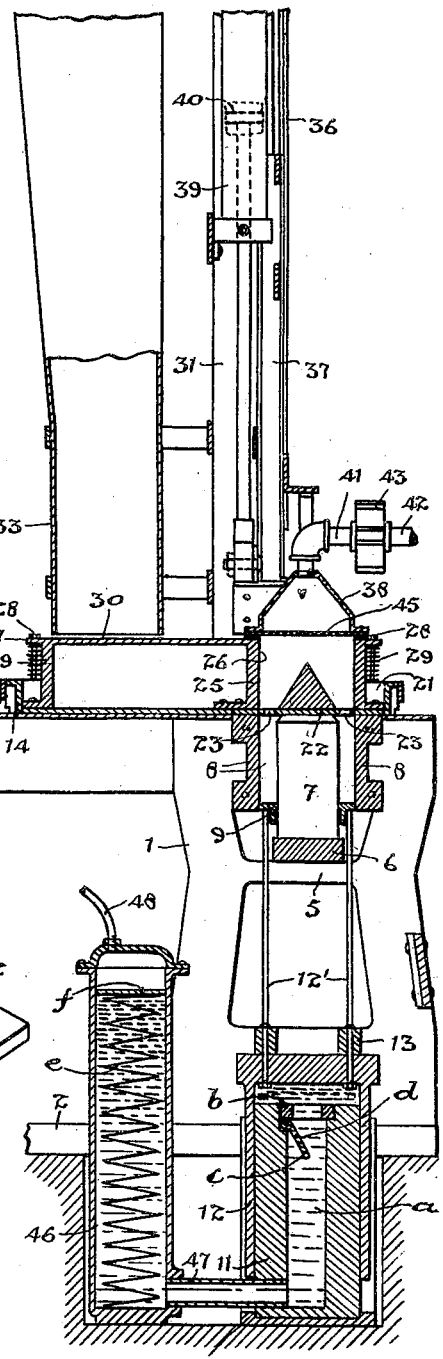
Inventor
Lee C. Carton.

April 25, 1933.  L. C. CARTON  1,905,619
CEMENT BLOCK MOLDING MACHINE
Filed Dec. 21, 1929    5 Sheets-Sheet 5

Inventor.
Lee C. Carton.

Patented Apr. 25, 1933

1,905,619

UNITED STATES PATENT OFFICE

LEE C. CARTON, OF DETROIT, MICHIGAN, ASSIGNOR TO ARTHUR CARTON, J. H. HENDERSON, JAMES E. MONTGOMERY, AND E. TRIMBLE, ALL OF TORONTO, ONTARIO, CANADA, AND THOMAS WATSON, OF WOODSTOCK, ONTARIO, CANADA

CEMENT BLOCK MOLDING MACHINE

Application filed December 21, 1929. Serial No. 415,864.

The principal objects of the invention are to enable the production of cement blocks or other articles to be formed of finely comminuted materials at lesser cost and in greater quantity than has hitherto been practicable.

A further object is to produce cement blocks with walls of greater density and strength thereby enabling the use of much lighter wall sections which will reduce the weight of the block for the required compression strength and will effect a considerable saving in material.

A still further object is to provide a machine which will be semi-automatic in its operation and will reduce the labor to the minimum.

The principal features of the invention consist in the novel construction and arrangement of parts whereby the comminuted materials from which the blocks are made are forced into and compressed in the mold under fluid pressure and whereby the mechanisms for feeding the comminuted materials to the mold, closing the mold to apply the fluid pressure, and removing the compressed block from the mold are operated in accurately timed relation by fluid pressure operated devices.

In the accompanying drawings Figure 1 is a side elevational view of the machine showing the cap for closing the mold and applying the fluid pressure in the raised position in full lines and in the lowered position in dotted lines.

Figure 2 is a front elevational view of the machine.

Figure 3 is a vertical sectional view of the forward part of the machine taken on the line 3—3 of Figure 2.

Figure 6 is an enlarged plan detail of the screen used in the mold closing cap.

Figure 7 is a perspective detail of the slotted guide plate for directing the comminuted materials into the mold cavities.

Figure 8 is a front elevational view of the upper portion of the machine showing an arrangement of tampers.

Figure 9 is a perspective view of the grid plate or palette.

Figures 1, 4, 5:
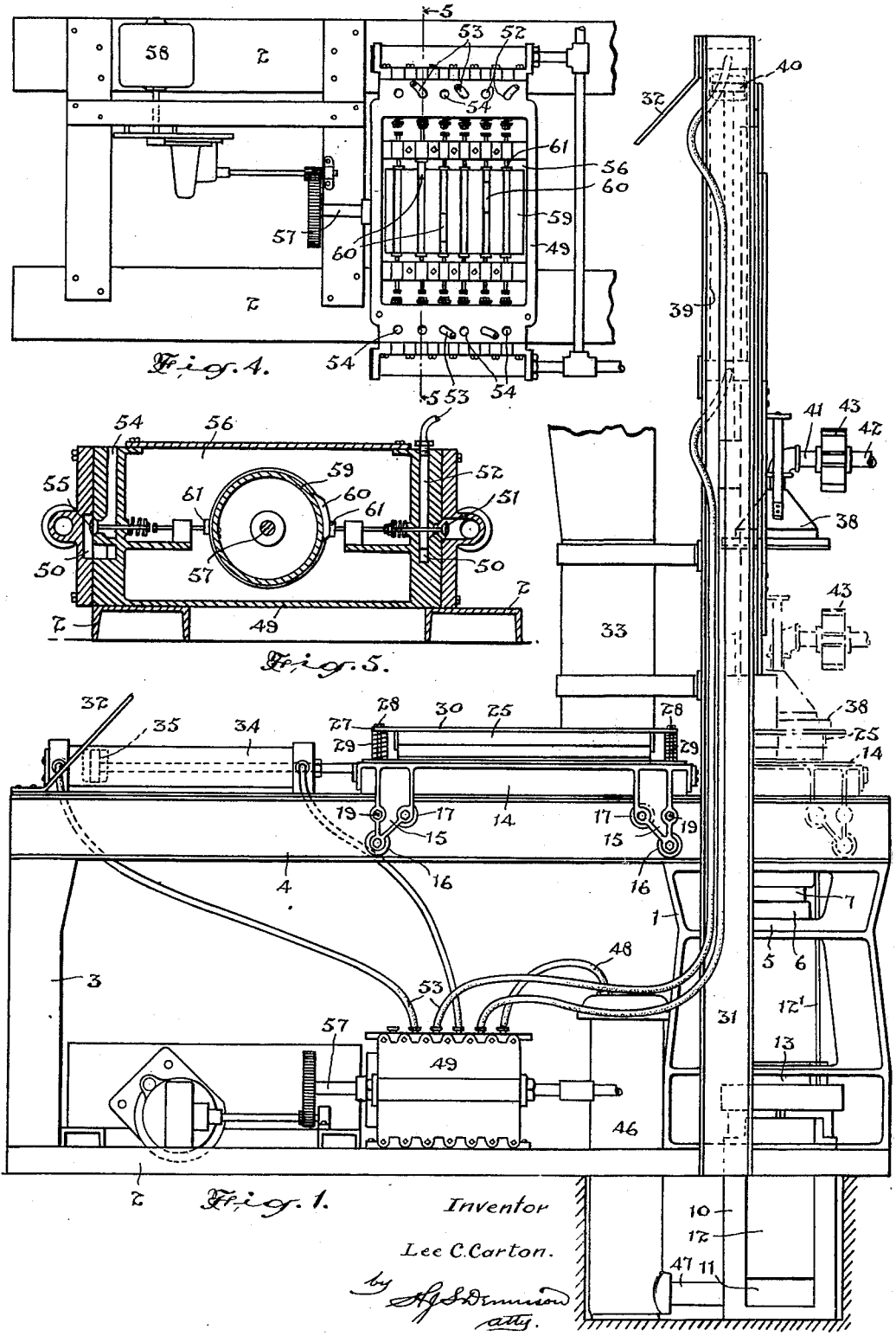
Figure 4 is a plan view of the timing mechanism for controlling the operation of the various fluid operated mechanisms.
Figure 5 is an enlarged vertical section of the timing mechanism taken on the line 5—5 of Figure 4.
Figure 10:
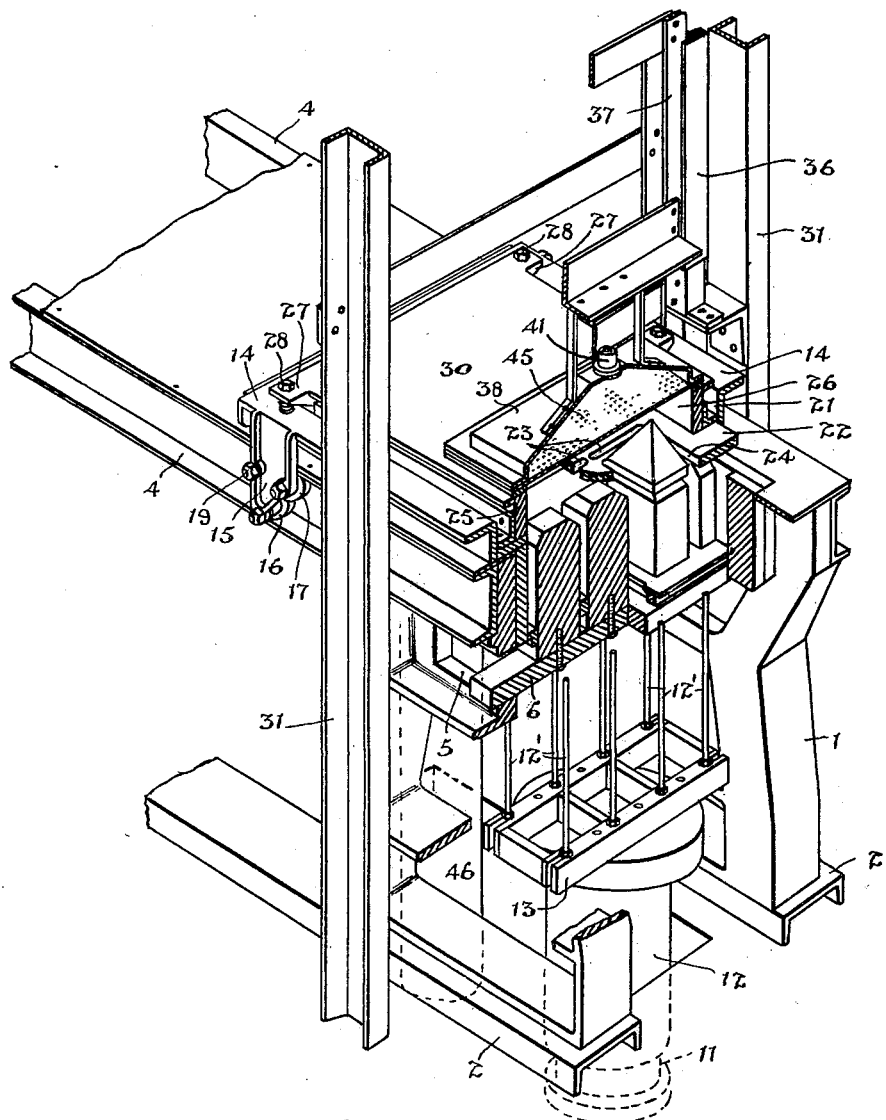
Figure 10 is a perspective view of a portion of the machine showing the molding elements in cross section and in position to receive the fluid pressure.

In reference to the accompanying drawings a heavy cast iron frame 1 of substantially rectangular form is mounted at one end of a pair of parallelly spaced channel sections 2 which form the base of the machine. A frame 3 is arranged at the opposite ends of the base members 2 and a pair of parallelly spaced channel bars 4 are mounted at the upper ends of the frames 1 and 3 with the flanges turned outwardly forming a pair of trackways.

The frame 1 is formed with transverse flanged members 5 in the sides and on these are supported the base plate 6 of the mold upon which are rigidly secured the vertical cores 7.

The side and end plates 8 of the mold are rigidly mounted within the frame 1 which is open at the top and a grid plate 9 or palette is slidably arranged in the mold surrounding the cores 7.

A stirrup shaped frame 10 mounted centrally under the frame 1 and extending downwardly therefrom supports a hydraulic ram 11, the cylinder 12 of which is arranged to raise and lower below the base plate 6 of the mold. A frame 13 is secured to the top of the cylinder 12 and carries a plurality of vertical rods 12' which extend upwardly at either side of the base plate 6 of the mold and are adapted to engage and lift the grid 9 and the cement block formed in the mold clear of the top thereof.

A carriage 14 extends across the top of the frame structure described and is provided with legs 15 at either end extending downwardly at either side of the longitudinal channel members 4.

Rollers 16 and 17 are mounted on studs extending inwardly from the side legs of the carriage, the rollers 16 resting on the lower flanges and the rollers 17 engaging the upper flanges. Studs 19 adjustably mounted in the legs 15 are provided with rollers 20 at their inner ends to engage the webs of the members 4 and hold the carriage from lateral movement.

The forward end of the carriage is formed with a rectangular opening 21 and within this opening is placed a rectangular plate 22 which covers the top of the mold. The plate 22 is formed with a plurality of longitudinal and transverse slots 23 and 24 which register with the spaces between the walls and the cores of the mold. The top of the plate 22 is formed with pyramid-shaped portions arranged over the cores providing sloping surfaces to direct the comminuted material, of which the block is to be formed, into the slots 23 and 24 with the least possible resistance.

A rectangular frame 25, the inner walls 26 of which are aligned with the inner walls of the mold, is arranged within the opening 21 of the carriage and engages the top surface of the slotted plate 22 around the sides. This frame is provided with laterally extending lugs 27 at either side and bolts 28 secured in the top of the carriage extend slidably through said lugs, the weight of the frame being supported on coil compression springs 29 surrounding said bolts between the carriage and the lugs. A flat table surface 30 extends rearwardly from the rectangular frame 25 level with the top thereof.

A pair of standards 31, secured at the bottom to the base members 2, extend vertically upward outside of the frame 1 and support a vertical frame structure above the table, brace members 32 being connected to the upper ends of the standards and extending angularly downward and secured to the rear end of the side channels 4.

A feed hopper 33 is secured to the back of the vertical frame with the lower end in sliding contact with the flat table surface 30 carried by the movable carriage.

A ram 34 is mounted horizontally on the frame formed by the horizontal members 4 and their supports and the piston 35 thereof is connected thereto to reciprocate the carriage and move the opening of the frame 25 under the hopper chute to receive a charge of comminuted material and then carry it to the mold.

A pair of vertical guides 36 are formed in the vertical frame structure centrally above the mold and a sliding frame 37 arranged between said guides supports a hood 38 which is adapted to cover the opening of the horizontal frame 25.

A ram 39 is secured in the vertical frame above the hood and the piston 40 thereof is connected to the sliding vertical frame 37.

A conduit 41 is connected to a flexible tube 42 and conducts fluid pressure, preferably compressed air, to the hood 38, a suitable valve 43 being arranged in said conduit and being provided with an operating lever 44 which is within easy reach of the operator, or it may be operated automatically.

A perforated screen 45 is arranged within the hood 38 to distribute the air pressure uniformly over the surface of the comminuted material within the frame 25 so that it will be forced through the slots in the plate 22 with a uniform movement and pressure.

The ram 11 is formed with a central vertical bore $a$ at the top of which is arranged an inwardly offset collar $b$ on the lower side of which is hinged a valve $c$ which seats against the under side of the offset collar. The valve $c$ is formed with a small central orifice $d$ through which the oil, with which the ram is operated, flows.

The ram is preferably operated by air pressure applied to the oil and a reservoir 46 arranged adjacent to the ram is connected with the bore of the ram by a pipe 47.

Within the cylindrical reservoir, which is partly filled with oil is a coiled compression spring $e$, which supports a flat disc $f$, which may be of rubber or leather, at the top of the oil column therein.

A tube 48 is connected to the head of the reservoir 46 and leads to a supply of compressed air.

It will be readily understood that the application of air pressure to the various rams described must be controlled to operate them at the proper periods and a control device is arranged in the base of the machine.

The control device herein shown is in the form of a rectangular casing 49 mounted on the base members 2 and in either end of the casing is a pressure conduit 50 to which air under pressure from a suitable source is conducted. A plurality of valves 51 are arranged in ports connected with the pressure conduits and control the admission of the air pressure to the passages 52 to which the flexible tubes leading to the several rams are connected. Each of the passages 52 is connected to a conduit 53 which connects with an exhaust passage 54 arranged adjacent to the passage 52 and exhaust valves 55 are arranged to control the ports leading to said exhaust passages. The exhaust and pressure passages are placed in alternating arrangement in pairs in the casing 49.

Arranged in the central chamber 56 between the valve chambers is a horizontal shaft 57 which is driven through suitable reduction gearing by a small electric motor 58 and on this shaft is mounted a drum 59 upon the periphery of which is arranged a plurality of cams 60 which engage tappets 61 mounted in the casing to operate the valves.

It is not considered necessary to describe minutely the arrangement of the cams and valves but it will be readily apparent that the cams can be set to operate the inlet valves to open at one end of a cylinder concurrently with the opening of the exhaust valves connected with the opposite end of the cylinder and vice versa when the motion of the piston is reversed.

In the operation of the machine, the hood 38 is held raised while the carriage is moved rearwardly to receive a charge from the hopper and is then moved forwardly over the mold. The ram operating the carriage then holds the carriage in position while the hood is brought downwardly to engage the top of the frame 25. The ram operating the hood presses the frame downwardly against the supporting compression springs 29 so that an airtight joint is formed between the frame 25 and the slotted plate 22, and the plate 22 is held tightly to the top of the mold.

The operator then manipulates the valve 43 to admit high pressure air into the hood and the air thus admitted is spread evenly by the perforated screen 45 and blows the comminuted material downwardly through the slots in the plate 22 to fill the mold. This application of pressure packs the material into the mold with a remarkable degree of uniformity and solidity.

The hood is then raised and as it raises, the carriage is moved backwardly to receive another charge. As the carriage clears the mold in the backward movement the valve control mechanism directs pressure into the cylinder 46 which operates the ram cylinder 12 to move upwardly and through the rods 12′ lifting the grid 9 and the block formed thereon clear of the mold from which it is removed by the operator before the carriage is again moved forwardly.

Upon the release of air pressure from the reservoir 46 the spring $e$ lifts the disc $f$ which acts as a piston and draws the oil from the operating chamber of the ram. The valve $c$ swinging downwardly upon the release of pressure against the oil column in the ram allows a quick return of the ram cylinder to its lowered position.

The arrangement of the valve $c$ with its small opening $d$ throttles the flow of oil to the ram cylinder and allows it to move upwardly with a slow but powerful movement and the spring and floating piston, formed by the disc $f$, prevents turbulence in the body of oil in the receiver when high pressure air is admitted and ensures a smooth and uniform action of the ram.

Figure 11:
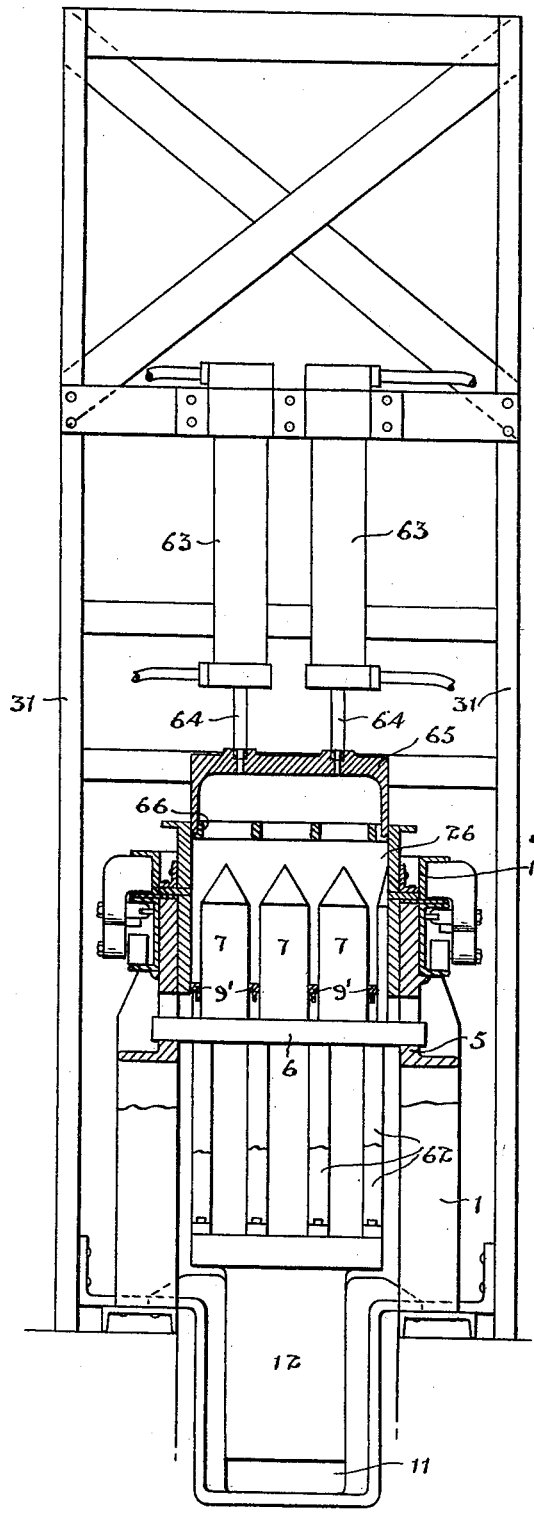
Figure 11 is a vertical part sectional elevation taken from the front of the machine showing a modified form of means for compressing the materials in the mold.

In the form of the invention shown in Figure 11 a plurality of rigid members 62 are mounted on the ram cylinder and engage the grid 9′ to force it upwardly against a counteracting pressure.

In place of the hood 38 and its operating mechanism a pair of air cylinders 63 are rigidly mounted on the upright frame supported by the standards 31 and the piston rods 64 are connected to a yoke member 65 which carries a grid member 66 similar to the lower grid 9′ which is adapted to enter the mold from the top.

With this form of the device the air is admitted simultaneously to the upper ends of the cylinders 63 and the grid 66 is moved downwardly into the opening 26 in the carriage 14 forcing the loose material downwardly into the mold and then compressing the material in the mold.

Air is admitted into the cylinder 46 immediately after the upper grid commences its downward movement and the lower grid moves upwardly simultaneous with the downward movement of the upper grid with the result that pressure is applied at both top and bottom and a block of very uniform density is formed.

When the desired amount of pressure has been applied the movement of the upper grid is reversed while pressure is maintained on the lower grid and the block is forced upwardly from the mold, the upper grid raising clear thereof to permit of its easy removal.

It may be found desirable for certain classes of work to tamp the material into the mold instead of forcing it in under fluid pressure and the machine may be provided with a pair of cylinders 67 which are shown in Figure 8 attached to the frame and these are fitted with tamping instruments on the pistons. The tampers will be reciprocated by means of air pressure controlled by the valve control mechanism described.

Figure 12:
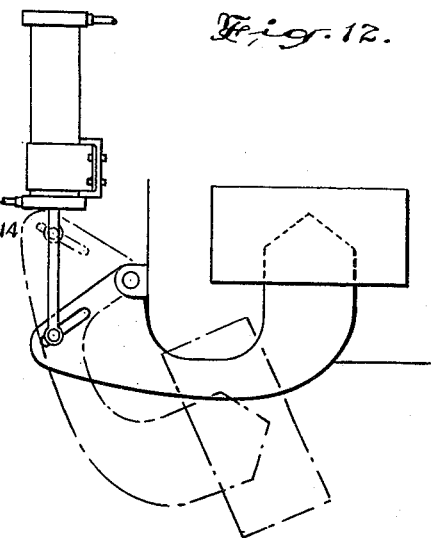
Figure 12 is a plan view showing a pneumatically operated means for removing the finished block from the machine.

In the device shown in Figure 12 the finished block when raised by the operation of the ram 11 is carried outwardly by the arm 68 pivotally mounted on the frame and operated by the pneumatic piston 69 operating in the cylinder 70.

What I claim as my invention is:—

1. A block molding machine, comprising a mold open at the top, means for transferring and suspending a measured quantity of comminuted materials over said mold, means operating in timed relation to said transferring means and forming an enclosure above said suspended materials, and means for directing fluid pressure into the enclosure formed above said suspended materials to force said materials into the mold.

2. A block molding machine, comprising a mold open at the top, means for transferring and suspending a measured quantity of comminuted materials over said mold, means operating in timed relation to said transferring means to seal thereagainst and form a cavity above said suspended comminuted materials, and means for applying fluid pressure to said cavity to blow said suspended materials downwardly into said mold.

3. A block molding machine, comprising a mold open at the top, means for transferring and suspending a measured quantity of comminuted materials over said mold, a hood adapted to form an enclosure over said suspended materials and having a pressure fluid conduit leading thereto, and means for raising and lowering said hood in timed cooperative relation to said transferring means.

4. A block molding machine, comprising the combination of a stationary mold open at the top, a reciprocable carrier for receiving and suspending a measured quantity of comminuted materials over the open top of said mold, a reciprocable closure member movable into and out of contact with said reciprocable carriage and adapted when in contact therewith to form a sealed enclosure above said suspended comminuted materials, means for reciprocating said carriage and closure member in timed sequence, and means for applying pressure to said enclosure discharging said suspended comminuted materials from said carriage into the mold.

5. A block molding machine, comprising a mold open at the top, means for delivering the comminuted material to be molded, a reciprocatory carriage having an opening to register with the delivery means at one end of its reciprocation to receive a charge from said delivery means and having a perforated bottom for temporarily supporting said charge of comminuted materials over the mold at the other end of its reciprocation, means retaining the delivery means closed while the carriage opening is out of register therewith, a hood reciprocably mounted above the mold and movable into engagement with the carriage to close the opening therein when said perforated bottom is in register with the mold, and a fluid pressure supply connected with said hood to force the comminuted material through the perforated bottom of the carriage into the mold.

6. A block molding machine, comprising a mold open at the top, movable carriage means for delivering the comminuted material to be molded having an opening therethrough forming the measuring means, a plate confined in the bottom of said opening and having a plurality of slots therethrough adapted to register with the cavities in the mold, a hood adapted to close the opening in said delivering means, a perforated screen within said hood, a fluid pressure conduit connected to said hood, and means for raising and lowering said hood.

7. A block molding machine, comprising in combination, a mold open at the top, horizontally reciprocable means for transferring a measured quantity of comminuted material to the mold, means for temporarily supporting said transferred materials above the open mold, a horizontally disposed fluid pressure-operated ram connected with said transfer means, a movable hood adapted to form an enclosure above said supporting means and to direct fluid pressure to force said comminuted material therefrom into the mold, a fluid pressure operated ram for raising and lowering said hood, fluid pressure operated means for lifting the completed block from the mold, and controlling means for directing the fluid pressure to said rams to effect their operation at the proper periods.

8. A block molding machine, comprising in combination a mold open at the top, horizontally reciprocable means for transferring a measured quantity of comminuted material to the mold, means for temporarily supporting said transferred materials above the open mold a horizontally disposed fluid pressure operated ram connected with said transfer means, a movable closure hood adapted to form an enclosure above said supporting means and to receive fluid pressure to force said comminuted material therefrom into the mold a fluid pressure operated ram for raising and lowering said hood, fluid pressure operated means for lifting the completed block from the mold, a valve chest having a plurality of co-operative pairs of inlet and exhaust valves adapted to direct a flow of fluid pressure to said rams and to exhaust the pressure therefrom, and means for operating sad valves.

9. A block molding machine, comprising a mold open at the top, horizontally reciprocable means for transferring a measured quantity of comminuted material to the mold, means for temporarily supporting said transferred materials above the open mold a horizontally disposed fluid pressure operated ram connected with said transfer means, a hood adapted to form an enclosure above said supporting means and to direct fluid pressure to force said comminuted material therefrom into the mold, a fluid pressure operated ram for raising and lowering said hood, fluid pressure operated means for lifting the completed block from the mold, a valve chest having a pressure chamber, a plurality of passages from said pressure chamber, valves controlling the passages from said pressure chamber, a plurality of passages connected with the aforesaid passages and opening to atmosphere, valves controlling the latter passages to exhaust the air, tubes connecting said valve controlled passages with said rams, and timing means for operating said valves at the required periods.

10. A block molding machine, comprising a mold open at the top and bottom, a grid closing the bottom of the mold cavities, means for supporting said grid against downward pressure, horizontally operable means for measuring a quantity of comminuted material and delivering and suspending same over the mold, a vertically operable covering means for forming with said horizontally operable means a fluid pressure chamber over the suspended comminuted materials, said chamber receiving fluid pressure to force said suspended materials into the mold, a ram arranged below the mold having a plurality of vertical rods extending upwardly and engaging said grid, fluid pressure means for operating said ram to raise said grid and means for controlling the operation of said feeding means, covering means and ram in operative sequence.

11. A block molding machine comprising, a mold open at the top, means for conveying and suspending a measured quantity of comminuted material over said mold, and fluid discharge means co-operating with said suspended materials for discharging fluid downwardly thereagainst to inject the suspended materials violently into the mold.

12. In a block molding machine, a mold, a supply hopper spaced from the mold, a guideway extending between said hopper and mold, a carriage reciprocably mounted on said guideway having a depressible receptacle adapted to register successively with said hopper and mold, and resilient means interposed between said carriage and receptacle for imparting a lifting influence to the latter whereby it intimately co-operates with said hopper.

LEE C. CARTON.